(12) United States Patent
Apps

(10) Patent No.: US 6,474,600 B1
(45) Date of Patent: Nov. 5, 2002

(54) AIRCRAFT FUSELAGE HAVING A REAR-END OPENING FOR CARGO DISPATCH

(75) Inventor: Howard R Apps, Stockport (GB)

(73) Assignee: BAE Systems PLC, Farnborough (GB)

( * ) Notice: Subject to any disclaimer, the term of this patent is extended or adjusted under 35 U.S.C. 154(b) by 0 days.

(21) Appl. No.: 09/647,710

(22) PCT Filed: Aug. 22, 2000

(86) PCT No.: PCT/GB00/03216

§ 371 (c)(1),
(2), (4) Date: Oct. 4, 2000

(87) PCT Pub. No.: WO01/23254

PCT Pub. Date: Apr. 5, 2001

(30) Foreign Application Priority Data

Sep. 24, 1999 (GB) .............................. 9922512

(51) Int. Cl.⁷ ................................. B64D 9/00
(52) U.S. Cl. ................ 244/137.1; 89/1.815; 244/129.5
(58) Field of Search .......................... 244/118.1, 137.1, 244/118.3, 129.6, 137.2, 129.5, 119; 89/1.801, 1.815, 1.818, 1.8, 1.803, 1.804

(56) References Cited

U.S. PATENT DOCUMENTS

| | | | |
|---|---|---|---|
| 2,942,812 A | | 6/1960 | Pauli |
| 2,977,853 A | * | 4/1961 | Gehrkens et al. ......... 244/137.1 |
| 3,056,335 A | * | 10/1962 | Thieblot et al. .......... 244/137.1 |
| 4,040,334 A | * | 8/1977 | Smethers, Jr. ............. 89/1.804 |
| 4,161,301 A | * | 7/1979 | Beardslery et al. ...... 244/137.1 |
| 4,208,949 A | | 6/1980 | Boilsen |
| 4,235,399 A | | 11/1980 | Shorey |
| 4,264,044 A | | 4/1981 | White |
| 4,349,168 A | | 9/1982 | Barnes et al. |
| 4,489,638 A | * | 12/1984 | Bastian et al. ............. 89/1.815 |
| 4,498,648 A | | 2/1985 | DeLuca et al. |
| 4,593,871 A | * | 6/1986 | Nichols ................... 244/118.1 |
| 5,031,860 A | | 7/1991 | Ruiz et al. |
| 5,279,199 A | * | 1/1994 | August ....................... 89/1.51 |
| 5,763,811 A | | 6/1998 | Ruzicka |
| 6,213,426 B1 | * | 4/2001 | Weber et al. ................ 244/119 |
| 6,260,802 B1 | * | 7/2001 | Hampsten ................ 244/137.1 |

FOREIGN PATENT DOCUMENTS

DE 24 26 417 12/1975

* cited by examiner

Primary Examiner—Galen Barefoot
(74) Attorney, Agent, or Firm—Nixon & Vanderhye P.C.

(57) ABSTRACT

An aircraft fuselage 10 comprising a cargo storage compartment 18, a rear bulkhead 16 at the rear of the compartment for withstanding internal air pressure in the fuselage, a closeable opening 20 in the rear bulkhead 18 through which an elongate item of cargo 25 can be passed, and an opening 26 in the rear of the fuselage 10 through which the said item 25 passes to be despatched from the aircraft with the fuselage 10 de-pressurised.

20 Claims, 2 Drawing Sheets

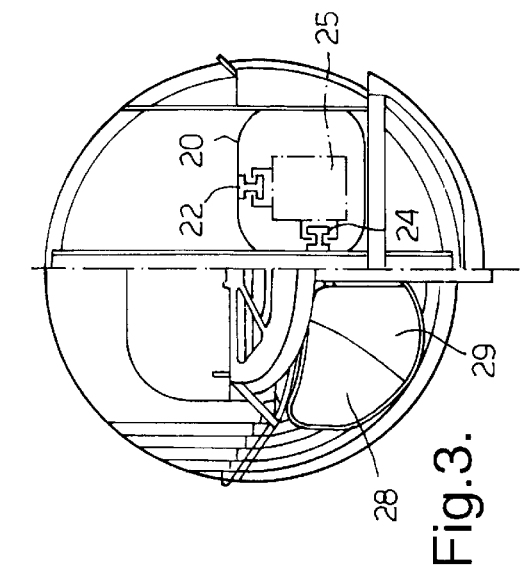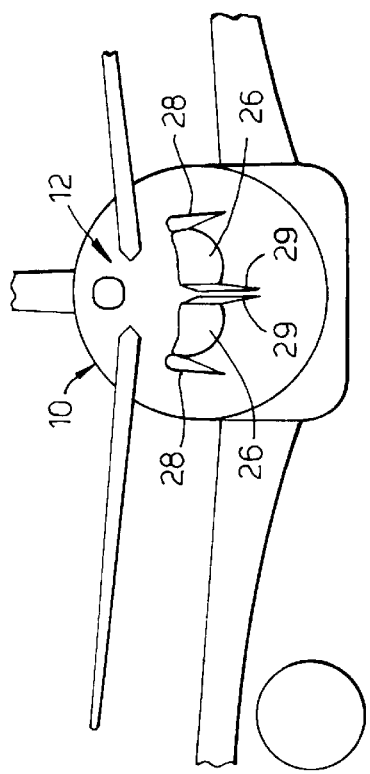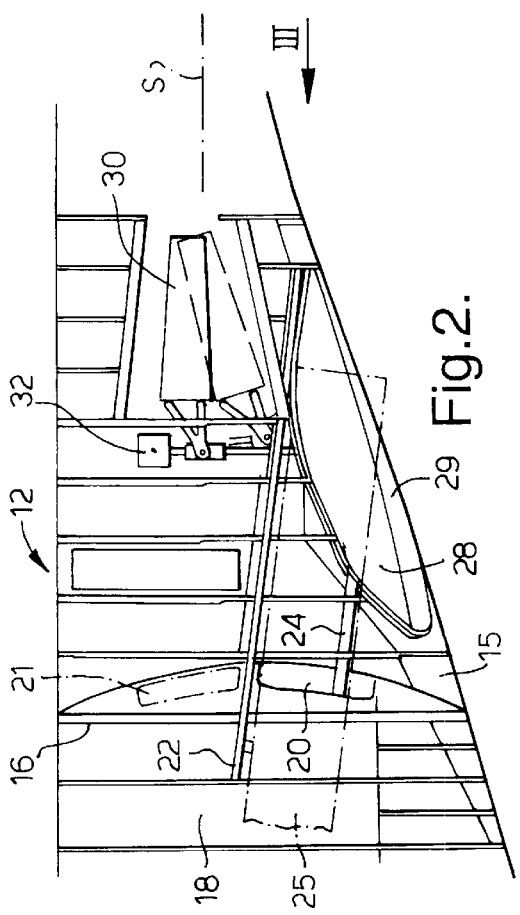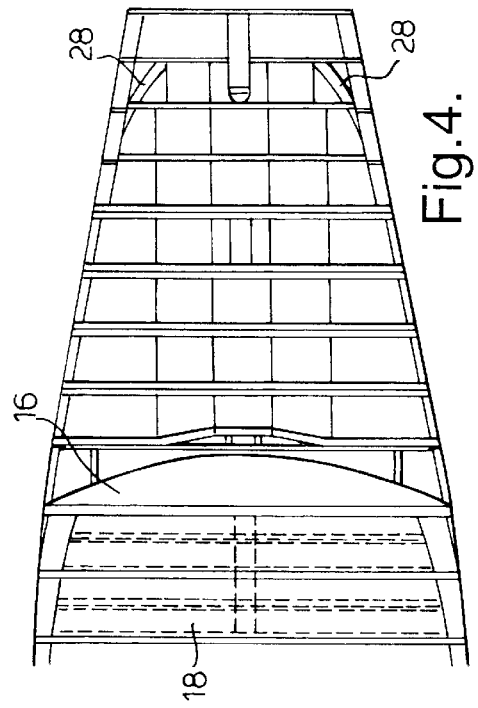

AIRCRAFT FUSELAGE HAVING A REAR-END OPENING FOR CARGO DISPATCH

SUMMARY OF THE INVENTION

1. Field of the Invention

The invention relates to an aircraft fuselage having a rear end opening for cargo despatch and is primarily concerned with a pressurisable fuselage which will facilitate the despatch of an item of cargo, particularly an elongate item of cargo.

2. Discussion of Prior Art

For many years it has been known to provide a large rear opening door arrangement at the rear of a freighter aircraft fuselage which operis the entire storage area of the fuselage to enable cargo stored in the aircraft to be despatched when the aircraft is in flight. Typically, bulky equipment such as crates of supplies and even vehicles can be despatched from the aircraft in that way. The aircraft is usually of a pressurised type and the cargo despatch is carried out at a relatively low altitude where the door arrangement can be opened with the fuselage de-pressurised. The use of a large rear opening door arrangement requires the use of an airframe of sufficient strength to minimise distortion due to the lack of structure in the doorway and to the weight of the doors when they are opened in flight. Also, where a passenger aircraft is adapted to carry freight, the use of a large rear door arrangement would involve major modifications to the aircraft which is obviously undesirable.

SUMMARY OF THE INVENTION

The present invention is concerned with the despatch from an aircraft of elongate items of cargo having a relatively small transverse dimension and is primarily concerned with an aircraft having a pressurisable fuselage which will enable such despatch to be carried out in an efficient manner.

According to a first aspect of the invention there is provided a pressurisable aircraft fuselage including a cargo storage compartment, a rear bulkhead for the compartment for withstanding internal air pressure in the fuselage, a closeable opening in the rear bulkhead through which an elongate item of cargo can be passed, and an opening in the rear of the fuselage through which the said item passes to be despatched from the aircraft with the fuselage de-pressurised.

The use of the closeable opening in the bulkhead means that an elongate article of relative small transverse dimension can easily be passed longitudinally through the opening for despatch from the aircraft. Moreover, to adapt a passenger-carrying aircraft to carry such cargo, a modification to the bulkhead involves a relatively straightforward modification compared to that involved in providing a large opening door arrangement as described above.

The closeable opening preferably has a door which is moveable between open and closed positions, for example by sliding. The door preferably contacts seal means when in its closed position. In such a case, pressure in the compartment may normally be arranged to press the door against its seal means.

Guide means may be provided for guiding the elongate item of cargo at least from the cargo storage compartment through the closeable opening to the opening in the fuselage. At least part of the guide means may be positioned such that the cargo will depend therefrom when being guided. Alternatively or additionally, part of the guide means may provide sideways support for the cargo when being guided. The guide means may comprise at least one rail. If desired, the guide means can be inclined at any angular orientation, whether up and down or side to side, in relation to the straight and level flight direction of the aircraft.

In one embodiment the guide means may firstly guide the item of cargo from a storage location in the fuselage to a said closeable opening and thereafter guide the item through the closable opening to the opening in the fuselage.

In this embodiment the guide means may include rails which are interrupted in the region of the closeable opening with co-operative runners optionally adapted to carry the item of cargo and being staggered so as always to support the cargo during guidance even when one runner is passing between lengths of rail.

The runners may have wheels and may be rigidly attached to a cargo support.

The guide means may be powered, for example as by electrical or pneumatic or hydraulic power, or may rely upon gravity and/or human intervention to achieve movement of the item of cargo.

In a preferred embodiment, the bulkhead has a number of closeable openings therein to enable the elongate items of cargo to be despatched from the aircraft via each closeable opening, for example simultaneously. In such a case, a number of openings may be provided in the fuselage to correspond with the closeable openings in the bulkhead.

The or each opening may conveniently be positioned on a rear underside portion of the fuselage. In that way, a modification to an aircraft to define the openings is less likely to interfere with tailplane mounting arrangements on certain aircraft.

The or each opening in the fuselage may be closeable by suitable doors. However, unlike the large door arrangement of know types of freight aircraft, each door, by virtue of its end location and the shape of the cargo, can be relatively small to enable the elongate item of cargo to be despatched therethrough. In this way expensive structural reinforcement to the fuselage to compensate for large door openings can be avoided.

In a preferred embodiment, the or each opening in the bulkhead is arranged to one side of a keel beam for the fuselage.

In order to facilitate loading of the elongate item of cargo into the fuselage, the fuselage may have a further closeable opening therein which may itself be elongate. Such an opening may conveniently be positioned near the front of the fuselage and may comprise an existing fuselage loading door. Where existing pressurised fuselages are being adapted according to the invention this feature additionally enables the invention to be realised at the lowest cost and by adding minimal weight to the aircraft.

According to a second aspect of the invention there is provided an aircraft having a fuselage according to the first aspect of the invention or any of the consistory clauses relating thereto.

According to a third aspect of the invention there is provided a method of despatching an item of cargo from a pressurised aircraft fuselage, the method including the steps of de-pressurising the fuselage, opening a door in a rear pressure bulkhead of the fuselage and passing the item of cargo through the doorway to despatch it from the aircraft.

BRIEF DESCRIPTION OF THE DRAWINGS

An aircraft fuselage according to the invention will now be described by way of example with reference to the accompanying drawings in which:

FIG. 2 is an elevation of the fuselage rear end shown in FIG. 1;

FIG. 3 is an end view of the fuselage shown in FIG. 2 looking in the direction of arrow III in FIG. 2, the right hand half being cut away to show an opening in a rear pressure bulkhead;

FIG. 4 is a plan view of the rear end of the fuselage shown in FIG. 2, and

FIG. 5 is a rear view of an aircraft having the fuselage of FIGS. 1 to 4 and showing rear doors on the fuselage in an open position.

DETAILED DISCUSSION OF EMBODIMENTS

Figure 1:
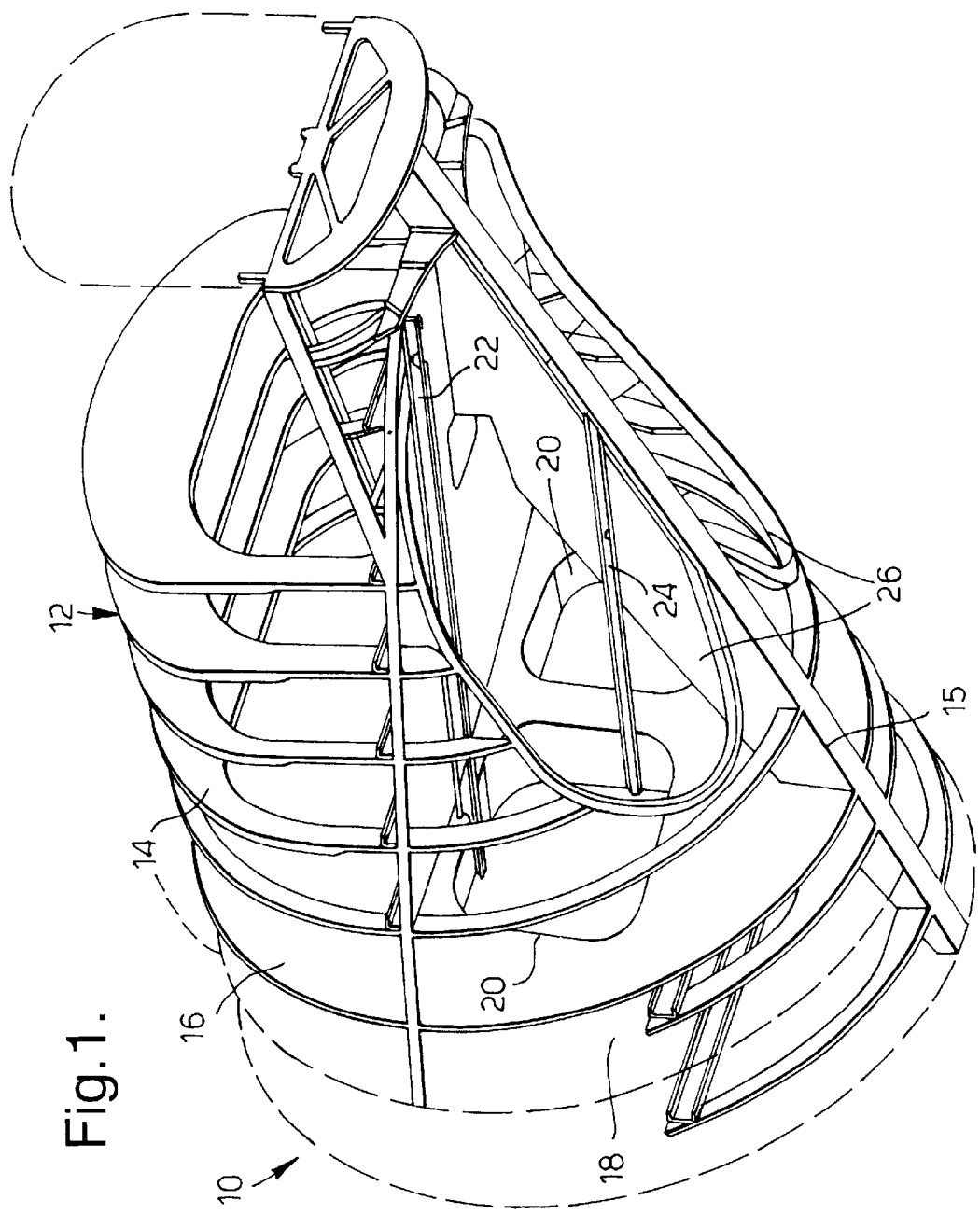
FIG. 1 is a perspective view of part of the rear end of an aircraft fuselage in accordance with the invention from which cargo can be despatched.

A fuselage 10 has a rear end 12 having a profile defined by formers or frames 14 which are covered by a skin (not shown). A keel beam 15 is provided in the usual manner.

The fuselage 10 is of a kind which is pressurised and a rear pressure bulkhead 16 is provided at the rear of a cargo carrying compartment 18. As will be seen in FIGS. 1 and 3, the rear pressure bulkhead 16 is formed with two openings 20 arranged one each side of the keel beam 15 which provide unobstructed access to the cargo compartment from outside the rear pressure bulkhead. The openings are closeable by means of doors 21 (shown raised in FIG. 2) which preferably slide into and out of a closed position. The doors 21 are in contact with seals (not shown) and when the doors are in the closed position, the pressure in the fuselage presses the doors against the seals to make a seal.

Two sets of upper and side rails 22, 24 are provided, one each side of the keel beam 15, for supporting and guiding respective elongate items of cargo 25, one of which is shown diagrammatically in broken lines in FIGS. 2 and 3. The item of cargo 25 has a relatively small transverse dimension compared to its length and the closeable openings 20 can be dimensioned accordingly and it can be seen that the closeable openings provide ideal passageways for such items, being small in size but able because of their end location to accommodate very long items of cargo for despatch from the aircraft. The rails 22, 24 extend between the cargo carrying compartment 18 and two openings 26 on the underside of the fuselage. Each of the two openings 26 may be closeable by means of two doors 28, 29 (see FIGS. 2 and 5). As will be appreciated from FIG. 5, the doors 28 swing outwards from the closed position into an open position and the doors drop downwards and inwards from the closed position into their open position. The item of cargo 25 is arranged to depend from relevant upper rail 22 as the item moves towards the associated opening 26 in the rear end 12. The associated side rail 24 provides sideways support for the item of cargo at it travels rearwards.

It will be noted from FIG. 2 that the rails 22, 24 are inclined downwards at an angle to the straight and level flight path of the aircraft indicated at S. In that way, items of cargo 25 may travel downwards under gravity if necessary away from the bulkhead 16 to be despatched through the openings 26 in the fuselage.

A suitable drive arrangement such as an electric motor can if desired be provided for driving the items of cargo 25 along the rails 22, 24 and out through the rear openings 26.

The arrangement of rails 22, 24 is such that interference with a tailplane box 30 is avoided. Therefore, if an existing aircraft is to be modified to carry the elongate items of cargo 25 for despatch from the aircraft, the modifications need not involve alterations to tailplane mounting and actuation, in most cases. As seen in FIG. 1, the tailplane box 30 is moveable between a full line position and a broken line position by means of an actuator 32.

The fuselage 10 may be constructed so as to define an elongate opening (not shown) near the front to enable the elongate items of cargo 25 to be loaded into the compartment 18. In operation, the aircraft flies at a normal cruising altitude to a zone where a selected item of cargo 25 is to be despatched. The aircraft then descends to an altitude at which the fuselage can be de-pressurised safely and one or both of the doors 21 on the bulkhead 16 are then raised into an open position. An item of cargo 25 in the compartment 18 is suitably (ie, automatically if necessarily) lifted and conveyed to the rails 22, 24. Once mounted on the rails 22, 24, the associated doors 28, 29 on the fuselage are opened and the item of cargo 25 is moved along the rails 22, 24 and despatched through the relevant opening 26.

What is claimed is:

1. A modification to a pressurizable aircraft fuselage for permitting in flight dispatch of an elongate item, said aircraft including a cargo storage compartment for storing at least one elongate item having a relatively small transverse dimension compared to its length and a rear bulkhead for the compartment for withstanding internal air pressure in the fuselage, said modification including:

at least one closeable opening in the rear bulkhead through which said at least one elongate item can be passed, said at least one closeable bulkhead opening being sized to accommodate said relatively small transverse dimension of said at least one elongate item; and at least one closeable opening in said fuselage rearward of said rear bulkhead through which said at least one elongate item passes to be despatched from the aircraft in flight with the fuselage de-pressurized.

2. An aircraft fuselage according to claim 1 in which said at least one closeable opening has a door which is moveable between open and closed positions.

3. An aircraft fuselage according to claim 2 in which the door is mounted for sliding movement between its open and closed positions.

4. An aircraft fuselage according to claim 2 in which the door contacts seal means when in its closed position.

5. An aircraft fuselage according to claim 4 in which pressure in the compartment is normally arranged to press the door against its seal means.

6. An aircraft fuselage according to claim 1 in which guide means is provided for guiding the at least one elongate item from the at least one closeable opening to an associated opening in the rear of the fuselage.

7. An aircraft fuselage according to claim 6 in which at least part of said guide means is positioned such that said at least one elongate item will depend therefrom when being guided towards said associated opening.

8. An aircraft fuselage according to claim 7 in which at least part of said guide means provides sideways support for said at least one elongate item when being guided towards said associated opening.

9. An aircraft fuselage according to claim 8 in which the guide means is inclined with respect to the straight and level flight direction of the aircraft.

10. An aircraft fuselage according to claim 6 in which the guide means comprises at least one rail.

11. An aircraft fuselage according to claim 1 in which said rear bulkhead has a number of closeable openings therein to enable a number of elongate items to be despatched from the aircraft via each closeable opening.

12. An aircraft fuselage according to claim 11 in which a number of openings is provided in the fuselage through which said elongated items are despatched.

13. An aircraft fuselage according to claim 1 in which said at least one opening is closeable.

14. An aircraft fuselage according to claim 1 in which each opening in the bulkhead is arranged to one side of a keel beam for the fuselage.

15. An aircraft fuselage according to claim 1 in which each opening is on a rear underside portion of the fuselage.

16. An aircraft fuselage according to claim 1 in which the fuselage has a further closeable opening therein through which said at least one elongate item can be loaded into the fuselage.

17. An aircraft fuselage according to claim 16 in which the further closeable opening is positioned near the front of the fuselage.

18. An aircraft fuselage according to claim 1 in which said at least one fuselage opening is sized to accommodate said relatively small transverse dimension of said at least one elongate item.

19. An aircraft having a fuselage according to claim 1.

20. A method of despatching an elongate item of cargo which has a relatively small transverse dimension compared to its length from a pressurized aircraft fuselage modified in accordance with claim 1, the method including the steps of:

de-pressurizing the fuselage;

opening said bulkhead door in said rear bulkhead of the fuselage;

opening said fuselage door in said fuselage which is rearward of said rear bulkhead, said fuselage door being sized to accommodate said relatively small transverse dimension of said elongate item; and passing said elongate item through said bulkhead door and said fuselage door to despatch it from the aircraft.

* * * * *